(No Model.)
E. H. BAUGH.
SEED SOWER.
No. 459,922. Patented Sept. 22, 1891.
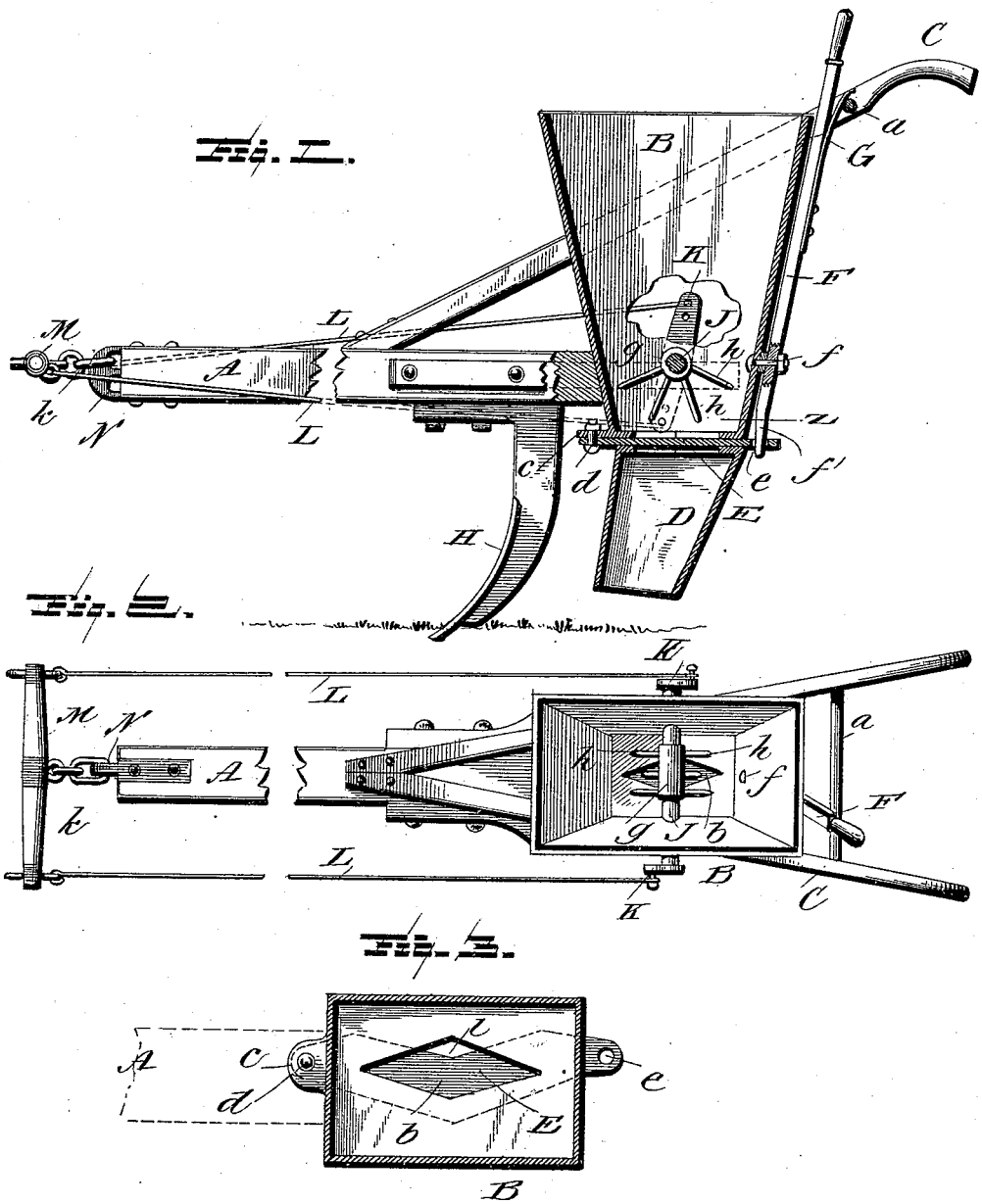
Witnesses
L. C. Hills
E. H. Bond
Inventor
Edward H. Baugh
per Chas. H. Fowler
Attorney

UNITED STATES PATENT OFFICE.

EDWARD H. BAUGH, OF POCAHONTAS, MISSISSIPPI.

SEED-SOWER.

SPECIFICATION forming part of Letters Patent No. 459,922, dated September 22, 1891.

Application filed May 20, 1891. Serial No. 393,401. (No model.)

*To all whom it may concern:*

Be it known that I, EDWARD H. BAUGH, a citizen of the United States, residing at Pocahontas, in the county of Hinds and State of Mississippi, have invented certain new and useful Improvements in Fertilizer-Distributers and Seed-Sowers; and I do hereby declare that the following is a full, clear, and exact description of the same, reference being had to the annexed drawings, making a part of this specification, and to the letters of reference marked thereon.

This invention relates to certain new and useful improvements in fertilizer-distributers and seed-sowers; and it has for its objects, among others, to provide a simple, cheap, and efficient device of this character by which the horse motion or movement of the horse will serve to actuate the distributer or agitator. The shaft of the agitator is extended through the sides of the hopper and is provided with cranks which are connected with the singletree to which the draft is applied. Novel means are provided for adjusting and regulating the amount of material to be dropped.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a longitudinal vertical section through my improved device. Fig. 2 is a top plan of the same. Fig. 3 is a cross-section on the line $z$ of Fig. 1.

Like letters of reference indicate like parts throughout the several views.

Referring now to the details of the drawings by letter, A designates the beam, upon which is supported the hopper B, which is provided with inclined walls, as shown, and suitably braced to firmly hold the same.

C are the handles which are secured to the beam and to the sides of the hopper at the rear end, and they are connected by a cross-bar $a$, as seen in Figs. 1 and 2.

The bottom of the hopper is provided with a diamond-shaped opening $b$, as shown in Fig. 3.

D is the feed-spout beneath the hopper, as seen in Fig. 1, and E is an adjustable plate arranged to close the opening between the hopper and feed-spout, as shown, and working in a recess formed between the bottom of the hopper and top of the spout, as seen in Fig. 1, thus forming a guide for the said plate in its movements. This plate is pivoted at its forward end to an extension of the hopper, as shown at $c$, the pivot $d$ passing through this extension and through the end of the plate, as shown in said Fig. 1, the other end of the plate being extended beyond the rear of the hopper and provided with a hole $e$, in which works loosely the lower end of the lever F, which is pivoted at $f$ to the rear wall of the hopper and is extended upward between the handles, as shown, and to the rear face of the lever is attached a spring-plate G, the free end of which bears against the cross-bar $a$ of the handles, as shown in Fig. 1, and holds the hand-lever in its adjusted positions. The lever is bent near its lower end, as shown at $f'$, so that its lowest portion extends vertically, as shown in Fig. 1, so as to more freely operate the sliding or oscillating plate E.

H is the plow secured to the beam in advance of the hopper in any suitable manner.

Within the hopper is arranged an agitator I, carried by a shaft J, journaled in the side walls of the hopper, the said agitator being carried by a sleeve $g$ on the shaft and carrying the fingers $h$. The ends of the shaft are extended beyond the sides of the hopper, and the shaft carries at the ends the oppositely-arranged cranks K, to which are connected the rods, cords, or chains L, the other ends of which are connected with the singletree M, to which the draft is applied. This singletree is connected with the clevis N on the forward end of the beam by links or other suitable means $k$, as shown in Figs. 1 and 2. The plate E is cut away upon one side, as shown at $l$ in Fig. 3, so that by adjustment of the said plate the discharge-opening may be varied in size to permit the passage of more or less material, and the opening will at all times be diamond-shaped, as will be understood from Fig. 3.

The operation will be apparent. The material being placed in the hopper, the agitator is rocked back and forth by the movement of the horse, which pulls on the singletree first in one direction and then in the opposite direction, thus rocking the shaft on which the agitator is carried. The manipulation of the hand-lever regulates the size of the discharge-opening.

What I claim as new is—

In a fertilizer-distributer and seed-sower, the combination of the hopper having a diamond-shaped feed-opening, an agitator located therein and connecting with draft-rods, an adjustable feed-plate of the form shown for regulating the feed-opening in the hopper and having a perforated rear extension, an operating-lever pivoted to the rear side of the hopper and with its lower end loosely entering the perforation or hole in the extension of the feed-plate and adapted to move laterally upon its pivotal connection, and a flat spring connected to the lever and its free end bearing with frictional contact against the cross-bar of the handles to retain the lever in its adjusted position when moved laterally, substantially as and for the purpose set forth.

In testimony that I claim the above I have hereunto subscribed my name in the presence of two witnesses.

E. H. BAUGH.

Witnesses:
A. J. McLAURIN,
W. W. WALKER.